(12) United States Patent
Chu et al.

(10) Patent No.: US 7,787,328 B2
(45) Date of Patent: *Aug. 31, 2010

(54) SYSTEM AND METHOD FOR COMPUTING A LOCATION OF AN ACOUSTIC SOURCE

(75) Inventors: Peter L. Chu, Lexington, MA (US); Michael Kenoyer, Austin, TX (US); Richard Washington, Marble Falls, TX (US)

(73) Assignee: Polycom, Inc., Pleasanton, CA (US)

( * ) Notice: Subject to any disclaimer, the term of this patent is extended or adjusted under 35 U.S.C. 154(b) by 1565 days.

This patent is subject to a terminal disclaimer.

(21) Appl. No.: 11/015,373

(22) Filed: Dec. 17, 2004

(65) Prior Publication Data

US 2005/0100176 A1   May 12, 2005

Related U.S. Application Data

(63) Continuation of application No. 10/414,421, filed on Apr. 15, 2003, now Pat. No. 6,912,178.

(60) Provisional application No. 60/372,888, filed on Apr. 15, 2002.

(51) Int. Cl.
*G01S 3/802* (2006.01)
(52) U.S. Cl. .................................................. 367/125
(58) Field of Classification Search ................ 367/118, 367/123, 125, 129
See application file for complete search history.

(56) References Cited

U.S. PATENT DOCUMENTS

| | | | | |
|---|---|---|---|---|
| 4,688,045 | A | 8/1987 | Knudsen | 367/123 |
| 5,465,302 | A | 11/1995 | Lazzari et al. | 381/92 |
| 5,581,620 | A | 12/1996 | Brandstein et al. | 381/92 |
| 5,778,082 | A | 7/1998 | Chu et al. | 381/92 |
| 6,393,136 | B1 | 5/2002 | Amir et al. | 382/103 |
| 6,731,334 | B1 | 5/2004 | Maeng et al. | 348/211.12 |
| 6,912,178 | B2 * | 6/2005 | Chu et al. | 367/123 |
| 2004/0032796 | A1 * | 2/2004 | Chu et al. | 367/123 |

(Continued)

FOREIGN PATENT DOCUMENTS

JP          410021047 A          1/1998

OTHER PUBLICATIONS

Harvey F. Silverman, et al., "The Huge Microphone Array (HMA)," May 1996 (published at http://www.lems.brown.edu/array/papers/).

(Continued)

*Primary Examiner*—Dan Pihulic
(74) *Attorney, Agent, or Firm*—Wong, Cabello, Lutsch, Rutherford & Brucculeri, L.L.P.

(57) ABSTRACT

In accordance with the present invention, a system and method for computing a location of an acoustic source is disclosed. The method includes steps of processing a plurality of microphone signals in frequency space to search a plurality of candidate acoustic source locations for a maximum normalized signal energy. The method uses phase-delay look-up tables to efficiently determine phase delays for a given frequency bin number k based upon a candidate source location and a microphone location, thereby reducing system memory requirements. Furthermore, the method compares a maximum signal energy for each frequency bin number k with a threshold energy $E_t(k)$ to improve accuracy in locating the acoustic source.

50 Claims, 7 Drawing Sheets

U.S. PATENT DOCUMENTS

2005/0100176 A1* 5/2005 Chu et al. .................. 381/92

OTHER PUBLICATIONS

Doublas E: Sturim, et al., "Tracking Multiple Talkers Using Microphone Array Measurements," (Apr. 1997) (published at http:/lems.brown.edu/array/papers/).

Michael S. Brandstein, et al., "A Robust Method for Speech signal Time-Delay Estimation in Reverberant Rooms," (Apr. 1997) (published at http://www.lems.brown.edu/array/papers/).

Michael S. Brandstein et al., "A Closed-Form Location Estimator for Use with Room Estimator for Use with Room Environment Microphone Arrays," (Jan. 1997) (published at http:/lems.brown.edu/array/papers/).

Michael S. Brandstein, et al., A Closed-Form Method for Finding Source Locations From Microphone-Array time-Delay Estimates, (Jan. 1997) (published at http:/lems.brown.edu/array/papers/).

John E. Adcock, "Otimal Filtering and Speech Recognition With Microphone Arrays," Doctotal Thesis, Brown University (May 2001) (published at http:/lems.brown.edu/array/papers/).

Michael S. Brandstein et al., "Microphone Array Localization Error Estimation with Application to Sensor Placement" (Jun. 1996) (published at http:/lems.brown.edu/array/papers/).

J. Adcock, et al., "Practical Issues in the Use of a Frequency-Domain Delay Estimator for Microphone-Array Applications" (Nov. 1994) (published at http:/lems.brown.edu/array/papers/).

M.S. Brandstein, et al., "A Practical Time-Delay Estimator for Localizing Speech Sources with a Microphone Array" (Sep. 1995) (published at http:/lems.brown.edu/array/papers/).

M.S. Brandstein, Abstract of "A Framework for Speech Source Localization Using Sensor Arrays," Doctoral Thesis, Brown University (May 1995) (published at http:/lems.brown.edu/array/papers/).

Paul C. Meuse, et al., "Characterization of Talker Radiation pattern Using a Microphone-Array" (May 1996) (published at http:/lems.brown.edu/array/papers/).

M.S. Brandstein, et al., "A Localization-Error Based Method for Microphone-Array Design" (May 1996) (published at http:/lems.brown.edu/array/papers/).

John E. Adcock, "Microphone-Array Speech Recognition via Incremental MAP Training," (May 1996) (published at http:/lems.brown.edu/array/papers/).

Michael Brandstein & Darren Ward (eds.), "Microphone Arrays: Signal Processing Techniques and Applications," pp. 157-201 (Springer, 2001).

Various materials regarding Aethra's Vega Star Gold product, downloaded from http:www.if2000/daten/ae/vi/vegastargolden.pdf (Jun. 2003) and http://aethra.com/eng/productsservices/videocommunication/vegastargold.asp.

"Intelligent Working Spaces," Chapter 5 (2002) (downloaded from http://ww.itc.it/abstracts2002/chapter5.pdf).

Various Materials regarding Vtel's "SmartTrak" product (1998), downloaded from http://www.vtel.com/support/catchall/smrtraks.htm; http://www.vtel.com/support/catchall/smarttra.htm; http://www.vtel.com/support/catchall/strakgde.htm; and http://www.vtel.com/support/catchall/strakins.htm.

Information regarding PictureTel's Limelight product (1998), downloaded from http://www.polycom.com/common/pw_item_show_doc/0,1449,538,00.pdf.

PictureTel's "Concorde 4500 and System 4000EX/ZX Troubleshooting Guide" (1997), downloaded from http://www.polycom.com/common/pw_item_show_doc/0,1449,444,00.pdf.

PictureTel's "Concorde 4500 Software Version 6.11 Release Bulletin" (1996), downloaded from http://www.polycom.com/common/pw_item_show_doc/0,1449,438,00.pdf.

PictureTel's "Venue2000 User's Notebook" (1999), downloaded from http://www.polycom.com/common/pw_item_show_doc/0,1449,675,00.pdf.

Information regarding PictureTel's 760XL Videoconferencing System (2000), downloaded from http://www.polycom.com/common/pw_item_show_doc/0,1449,427,00.pdf.

* cited by examiner

SYSTEM AND METHOD FOR COMPUTING A LOCATION OF AN ACOUSTIC SOURCE

CROSS REFERENCE TO RELATED APPLICATION

This application claims the benefit of Provisional Patent Application Ser. No. 60/372,888, filed Apr. 15, 2002, entitled "Videoconferencing System with Horizontal and Vertical Microphone Arrays for Enhanced Source Locating and Camera Tracking," which is incorporated herein by reference. This application is related to U.S. application Ser. No. 10/414,420, entitled Videoconferencing System with Horizontal and Vertical Microphone Arrays," by Peter Chu, Michael Kenoyer, and Richard Washington, filed Apr. 15, 2003, which is incorporated herein by reference. This application is a continuation application of U.S. patent application Ser. No. 10/414,421, filed Apr. 15, 2003, now U.S. Pat. No. 6,912,178 which is incorporated by reference in its entirety, and to which priority is claimed.

BACKGROUND OF THE INVENTION

1. Field of the Invention

This invention relates generally to signal processing and more particularly to a method for computing a location of an acoustic source.

2. Description of the Background Art

Spatial localization of people talking in a room is important in many applications, such as surveillance and videoconferencing applications. In a videoconferencing application, a camera uses spatial localization data to track an acoustic source. Typically, a videoconferencing system localizes the acoustic source by applying cross correlation techniques to signals detected by a pair of microphones. The cross correlation techniques involve finding the crosscorrelation between the time domain signals of a pair of microphones. The shift in time which corresponds to the peak of the cross correlation corresponds to the difference in time of arrival of the acoustic source to the two microphones. Knowledge of the difference in time of arrival infers that the source is located in a geometric plane in space. By using three pairs of microphones, one can locate the source by finding the intersection of the three planes.

However, the 2-microphone cross correlation techniques of the prior art provide slow, inaccurate, and unreliable spatial localization of acoustic sources, particularly acoustic sources located in noisy, reverberant environments. A primary reason for the poor performance of the two-microphone cross correlation techniques for estimating an acoustic source location is poor sidelobe attenuation of a directional pattern formed by delaying and summing the two microphone signals. For example, an acoustic source located in a reverberant environment, such as a room, generates acoustic signals which are reflected from walls and furniture. Reflected signals interfere with the acoustic signals that are directly propagated from the acoustic source to the microphones. For a 2-microphone array, the direct and reflected acoustic signals received by the microphones may increase sidelobe magnitude of the 2-microphone directional pattern, and may produce an erroneous acoustic source location. The poor sidelobe attenuation of the 2-microphone directional pattern is further discussed below in conjunction with FIG. 2C.

It would be advantageous to designers of surveillance and videoconferencing applications to implement an efficient and accurate method for spatial localization of acoustic sources, particularly acoustic sources located in noisy and reverberant environments.

SUMMARY OF THE INVENTION

In accordance with the present invention, a system and method for computing a location of an acoustic source is disclosed. In one embodiment of the invention, the present system includes a plurality of microphones for receiving acoustic signals generated by the acoustic source, at least one A/D converter for digitizing the acoustic signals received by the plurality of microphones, a data segmenter for segmenting each digitized signal into a plurality of blocks, an overlap-add filter bank for generating a plurality of transformed blocks by performing a Fast Fourier Transform (FFT) on each block, a memory configured to store phase-delay look-up tables, and a processor for computing the location of the acoustic source by processing the transformed blocks of each acoustic signal received by each microphone according to candidate source locations using the phase-delay look-up tables.

In one embodiment of the invention, the method for computing the location of the acoustic source includes receiving a plurality of M analog signals from a plurality of M microphones, digitizing each received analog signal, segmenting each digitized signal into a plurality of blocks, performing a discrete Fast Fourier Transform (FFT) on each block to generate N complex coefficients $F^p_m(k)$ per block, searching P blocks of each digitized signal for a maximum signal energy and identifying a block p' containing the maximum signal energy for each frequency bin number k, comparing the maximum signal energy with a threshold energy $E_t(k)$ and setting the complex coefficients in the P blocks of each digitized signal equal to zero when the maximum signal energy is less than the threshold energy for each frequency bin number k, determining phase delays using three look-up tables, multiplying each complex coefficient by an appropriate phase delay and summing the phase-delayed complex coefficients over the M microphones for each candidate source location and for each frequency bin number k, computing a normalized total signal energy for each candidate source location, and finally determining the location of the acoustic source based upon the normalized total signal energy for each candidate source location.

DETAILED DESCRIPTION OF THE DRAWINGS

Figure 1A:
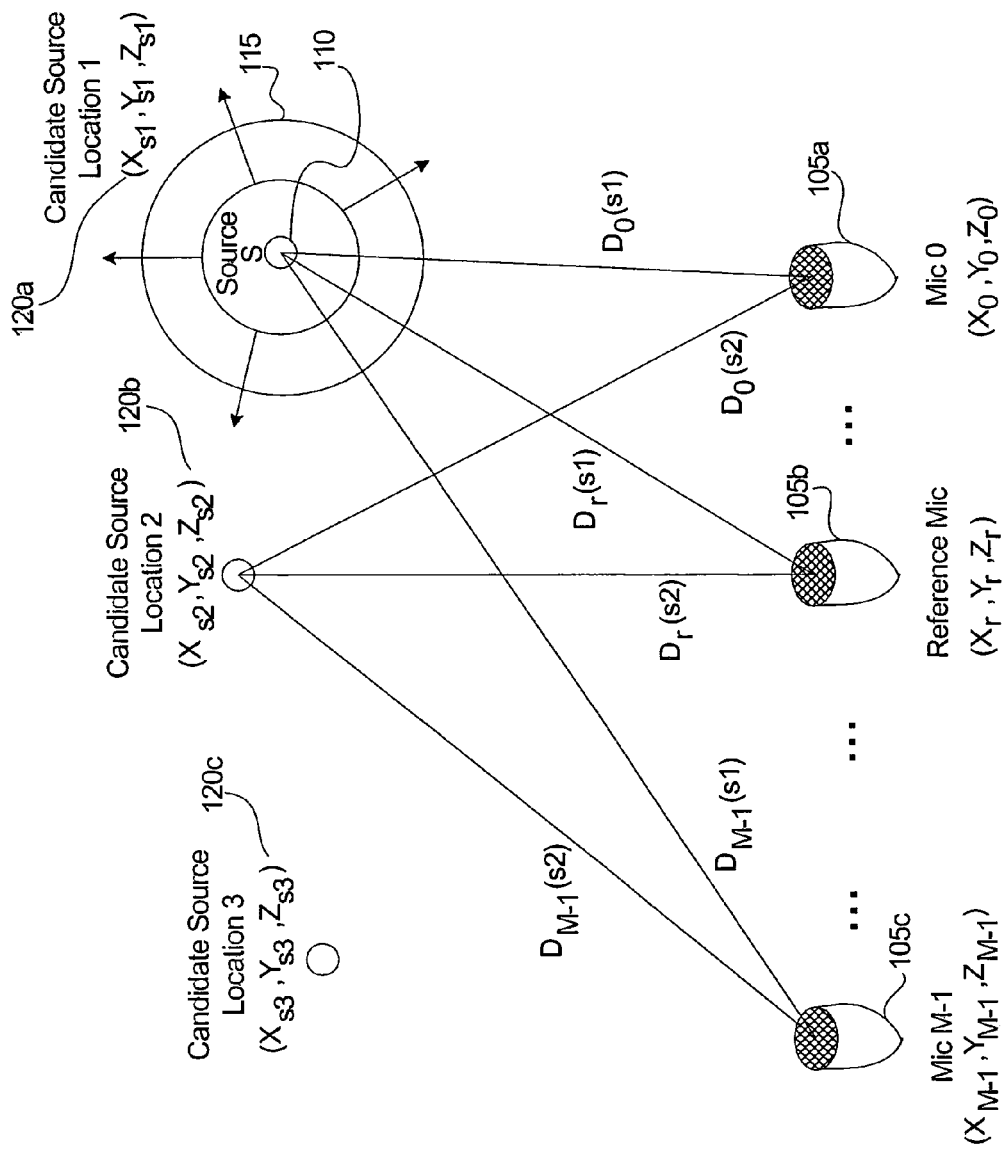
FIG. 1A is a diagram illustrating nomenclature and elements of an exemplary microphone/source configuration, according to one embodiment of the present invention.

FIG. 1A is a diagram illustrating nomenclature and elements of an exemplary microphone/source configuration, according to one embodiment of the present invention. Elements of FIG. 1A include a plurality of microphones 105a-c (also referred to as a microphone array) configured to receive acoustic signals from a source S 110, a candidate source location 1 $(X_{s1}, Y_{s1}, Z_{s1})$ 120a, a candidate source location 2 $(X_{s2}, Y_{s2}, Z_{s2})$ 120b, and a candidate source location 3 $(X_{s3}, Y_{s3}, Z_{s3})$ 120c. An integer microphone index m is used to label each microphone, where $0 \leq m \leq M-1$, M is a total number of microphones, and M is any integer greater than 1. For ease of illustration, the FIG. 1A embodiment shows three microphones 105a-c (i.e., M=3), although the present invention typically uses a larger number of microphones (i.e., M>3). The plurality of microphones 105a-c include a microphone 0 105a located at $(X_0, Y_0, Z_0)$, a reference microphone 105b located at $(X_r, Y_r, Z_r)$, and a microphone M-1 105c located at $(X_{M-1}, Y_{M-1}, Z_{M-1})$. According to the present invention, one microphone of the plurality of microphones 105a-c is designated as the reference microphone 105b, where any one of the plurality of microphones 105a-c may be designated as a reference microphone.

The source S 110 is any acoustic source for generating acoustic signals. For example, the source S 110 may be a person, an electrical apparatus, or a mechanical apparatus for generating acoustic signals. The acoustic signals generated by the source S 110 propagate away from the source S 110. Concentric circles 115 centered about the source S 110 are projections of spherical wave fronts generated by the source S 110 onto a two-dimensional plane of FIG. 1.

For the purposes of the following discussion, the source S 110 is located at the candidate source location 1 $(X_{s1}, Y_{s1}, Z_{s1})$ 120a. However, the scope of the present invention covers the source S 110 located at any one of the plurality of candidate source locations 120a-c, or at a location that does not coincide with any of the plurality of candidate source locations 120a-c.

The present invention computes a total signal energy received from each of the plurality of candidate source locations 120a-c by appropriately delaying the microphone signals with respect to a signal received by the reference microphone 105b, and then summing the delayed signals. The present invention may be implemented as application software, hardware, or application software/hardware (firmware). Although FIG. 1A illustrates three candidate source locations (120a, 120b, 120c), the present invention includes any number of candidate source locations. In addition, although a location of the source S 110 may or may not correspond to one of the candidate source locations 120a-c, the present invention estimates the location of the source S 110 at one of the plurality of candidate source locations 120a-c, based upon the total signal energy computed for each candidate source location.

FIG. 1A also shows distances measured from each microphone 105a-c to the candidate source locations 120a and 120b. For example, $D_0(s1)$ is a distance between the microphone 0 105a and the candidate source location 1 120a, $D_0(s2)$ is a distance between the microphone 0 105a and the candidate source location 2 120b, $D_r(s1)$ is a distance between the reference microphone 105b and the candidate source location 1 120a, $D_r(s2)$ is a distance between the reference microphone 105b and the candidate source location 2 120b, $D_{M-1}(s1)$ is a distance between the microphone 105c and the candidate source location 1 120a, and $D_{M-1}(s2)$ is a distance between the microphone 105c and the candidate source location 2 120b. Although FIG. 1A shows the microphones 105a-c, the candidate source locations 120a-c, and the source S 110 constrained to lie in the two-dimensional plane of FIG. 1A, the scope of the present invention covers any two-dimensional or three-dimensional configuration of the microphones 105a-c, the candidate source locations 120a-c, and the source S 110.

Figure 1B:
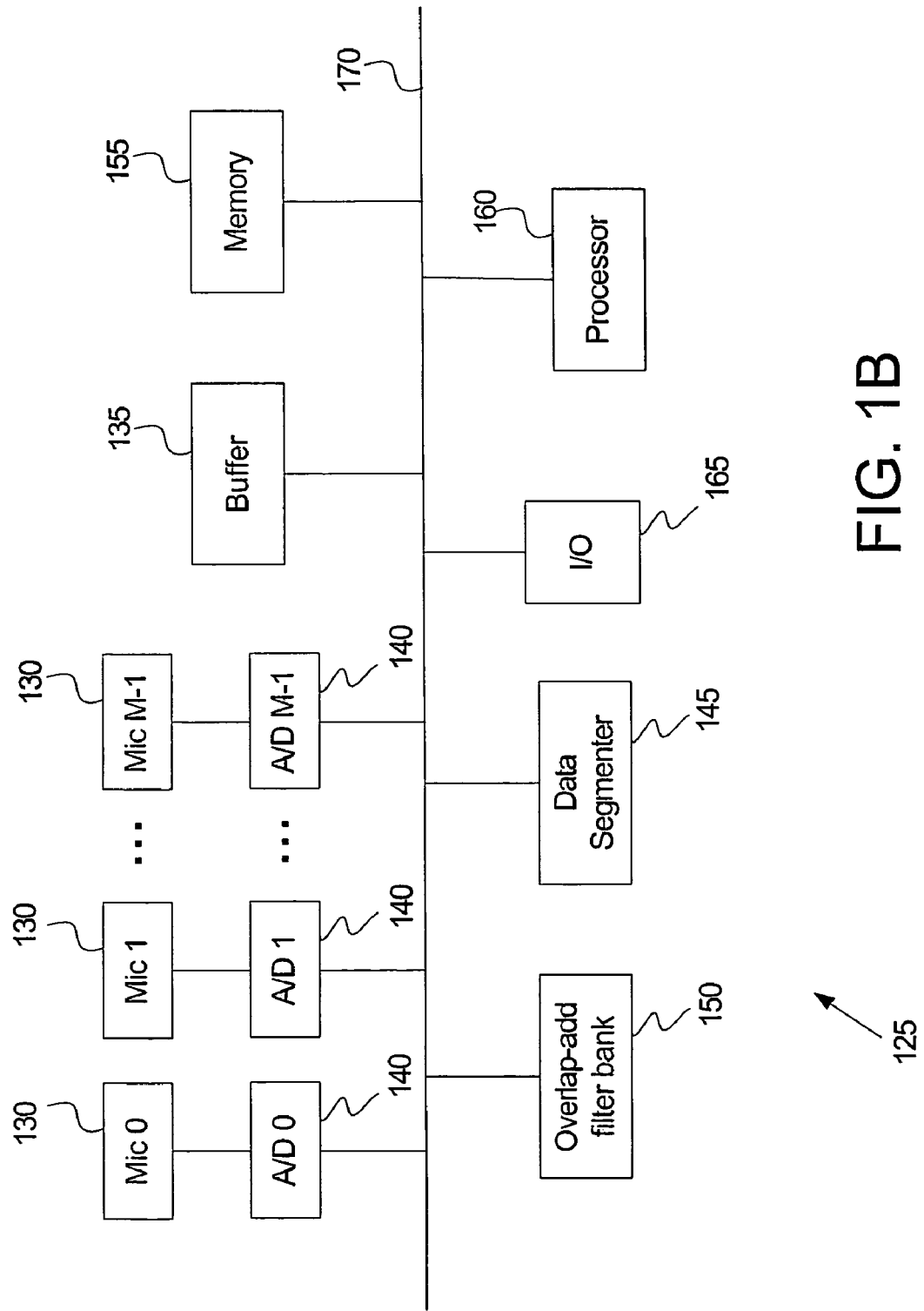
FIG. 1B is an exemplary block diagram of a system for locating an acoustic source, according to one embodiment of the present invention.

FIG. 1B is an exemplary block diagram of a system 125 for locating an acoustic source, such as the acoustic source S 110 (FIG. 1A), according to one embodiment of the present invention. Elements of the system 125 include M microphones 130 for receiving M acoustic signals generated by the acoustic source S 110, at least one analog/digital (A/D) converter 140 for converting the M received acoustic signals to M digital signals, a buffer 135 for storing the M digital signals, a data segmenter 145 for segmenting each digital signal into blocks of data, an overlap-add filter bank 150 for performing a Fast Fourier Transform (FFT) on each block of data for each digital signal, a memory 155 for storing acoustic source location software, look-up tables, candidate source locations, and initialization parameters/constants associated with determining the acoustic source location, a processor 160 for executing the acoustic source location software and for signal processing, an input/output (I/O) port 165 for receiving/sending data from/to external devices (not shown), and a bus 170 for electrically coupling the elements of the system 125.

According to the present invention, one method of locating the source S 110 is using a maximum likelihood estimate. Using the maximum likelihood estimate, the source S 110 is hypothesized to be located at a plurality of possible candidate locations, such as the candidate source locations 120a, 120b, and 120c (FIG. 1A). The maximum likelihood estimate may be implemented with the acoustic source location software stored in the memory 155 and executed by the processor 160, or acoustic source location firmware. In one embodiment of the method for computing an acoustic source location, the analog-to-digital (A/D) converter 140 digitizes each signal received by each microphone 130. Then, the data segmenter 145 segments each digitized signal into blocks of data. Next, the overlap-add filter bank 150 performs a discrete Fast Fourier Transform (FFT) on each block of data. For example, if each signal received by each microphone 130 is digitized and segmented into blocks of data, where each block of data includes N=640 digitized time samples, then each block of data sampled in time is mapped to a block of data sampled in frequency, where each data sampled in frequency is a complex number (also called a complex coefficient), and each block of data sampled in frequency includes N=640 discrete frequency samples. Each complex coefficient is associated with a frequency bin number k, where $0 \leq k \leq N-1$ and k is an integer.

Then, for each candidate source location 120a-c and for each frequency bin number k, each complex coefficient associated with each microphone's signal is multiplied by an appropriate phase delay, the complex coefficients are summed over all the microphone signals, and a signal energy is computed. A whitening filter is then used to normalize the signal energy for each frequency bin number k, and the normalized signal energies are summed over the N frequency bin numbers for each candidate source location 120a-c to give a total signal energy for each candidate source location 120a-c. The method then determines the candidate source location 120a-c associated with a maximum total signal energy and assigns this candidate source location as an estimated location of the source S 110. A computationally efficient method of implementing the maximum likelihood estimate for estimating an acoustic source location will be discussed further below in conjunction with FIGS. 3A-3B.

Figure 2A:
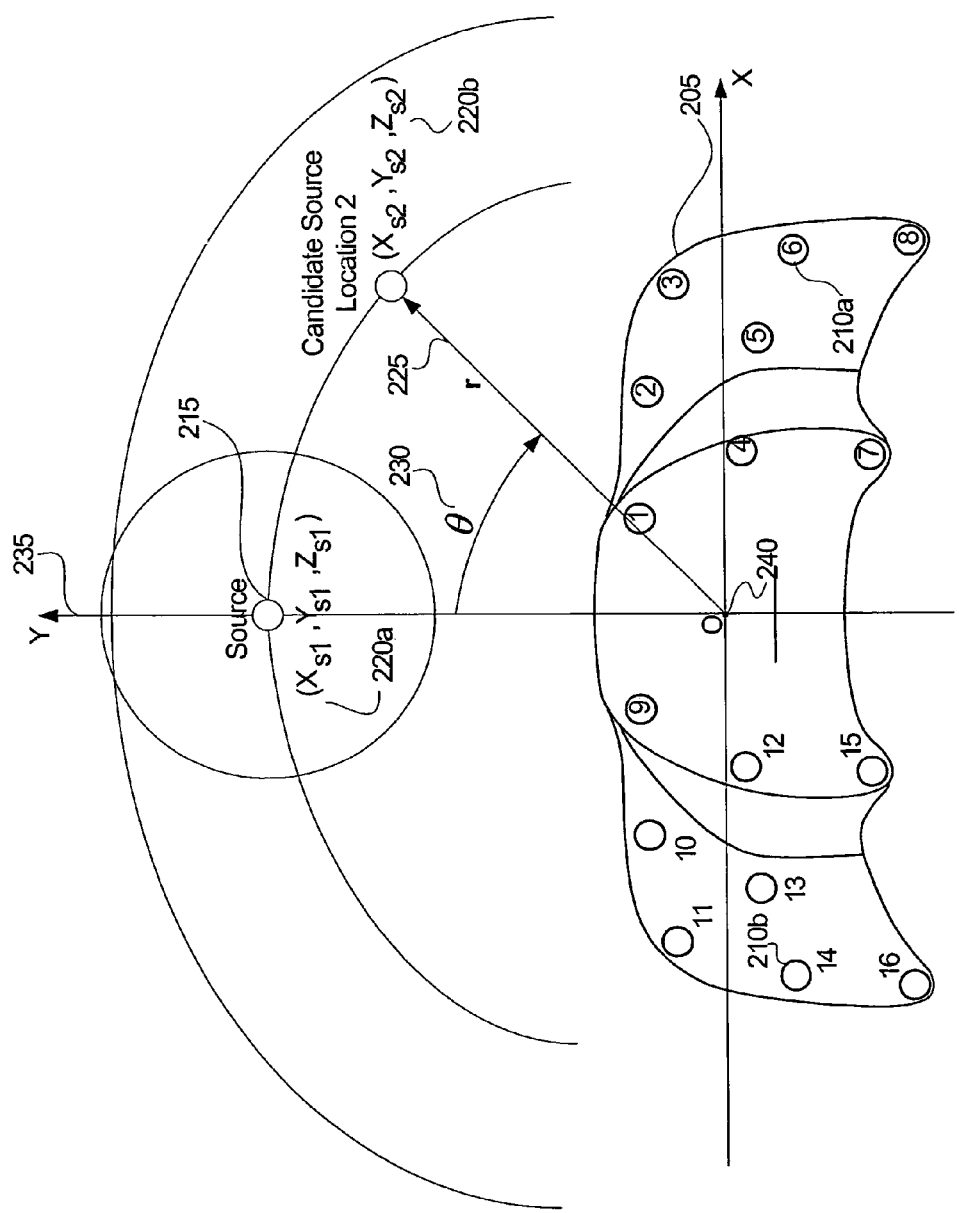
FIG. 2A is an exemplary embodiment a 16-microphone array, according to the present invention.

FIG. 2A illustrates one embodiment of a 16-microphone array 205 for receiving acoustic signals to be processed by acoustic source location software or firmware, according to the present invention. The 16-microphone array 205 includes an arrangement of 16 microphones labeled 1-16 configured to receive acoustic signals from an acoustic source 215. In the present embodiment, a distance between a microphone 6 210a and a microphone 14 210b is 21.5 inches. Thus, the 16-microphone array 205 spans 21.5 inches. The acoustic source 215 is located at a candidate source location 1 ($X_{s1}$, $Y_{s1}$, $Z_{s1}$) 220a. The acoustic source location software or firmware processes the signals received by the 16 microphones according to candidate source locations. For simplicity of illustration, the FIG. 2A embodiment shows only candidate source locations 220a and 220b, but the scope of the present invention includes any number of candidate source locations. Although FIG. 2A illustrates a specific spatial distribution of the 16 microphones as embodied in the 16-microphone array 205, the present invention covers any number of microphones distributed in any two-dimensional or three-dimensional spatial configuration. In the FIG. 2A embodiment of the present invention, each candidate source location may be expressed in polar coordinates. For example, the candidate source location 2 220b has polar coordinates (r,θ), where r is a magnitude of a vector r 225 and θ 230 is an angle subtended by the vector r 225 and a positive y-axis 235. The vector r 225 is a vector drawn from an origin ○ 240 of the 16-microphone array 205 to the candidate source location 2 220b, but the vector r 225 may be drawn to the candidate source location 1 220a, or to any candidate source location of a plurality of candidate source locations (not shown).

Figure 2B:
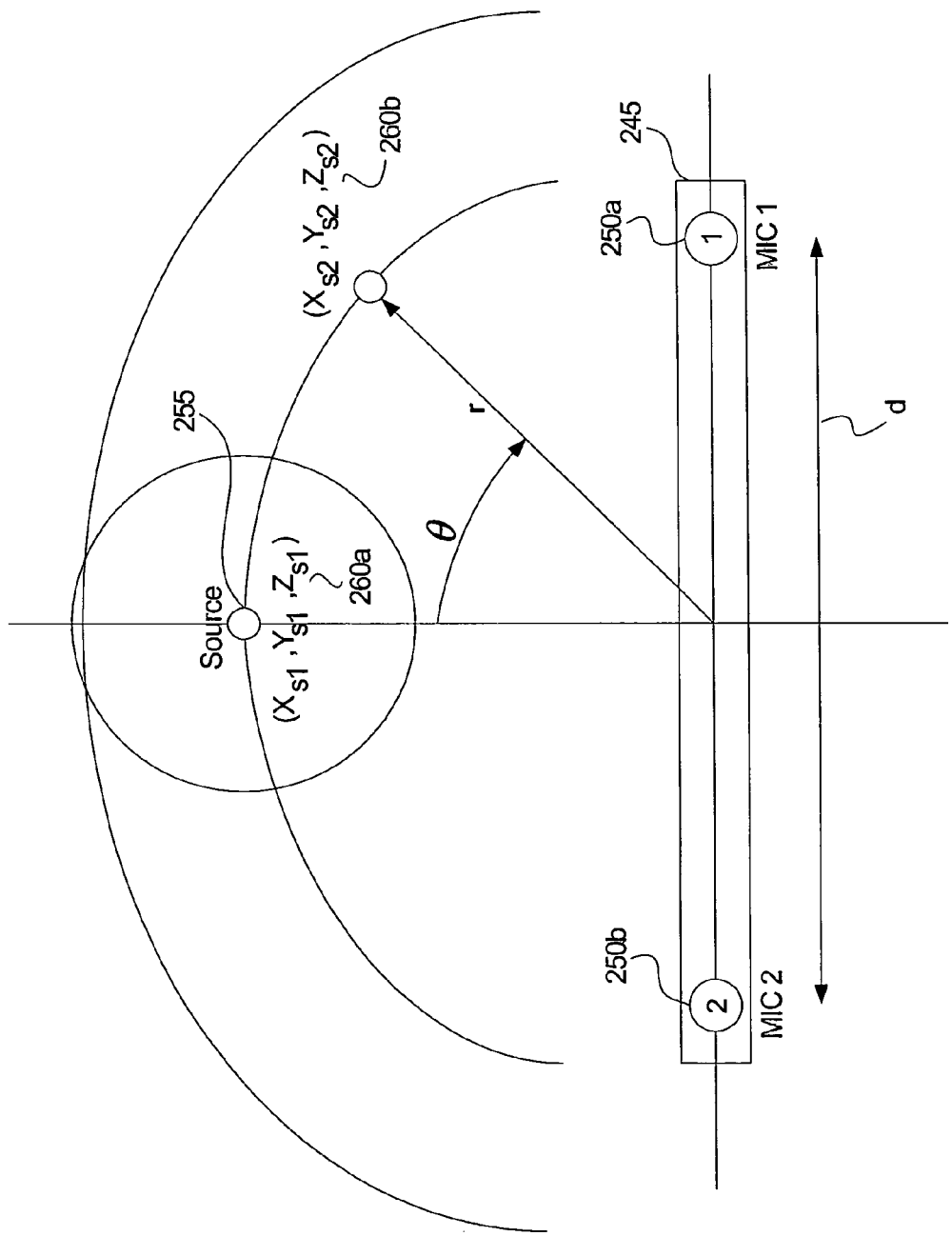
FIG. 2B is an exemplary embodiment of a 2-microphone array, according to the present invention.

FIG. 2B is one embodiment of a 2-microphone array 245 for receiving acoustic signals to be processed by acoustic source location software or firmware, according to the present invention. The microphone array 245 includes a microphone 1 250a and a microphone 2 250b separated by a distance d, an acoustic source 255 located at a candidate source location 1 ($X_{s1}$, $Y_{s1}$, $Z_{s1}$) 260a, and a candidate source location 2 ($X_{s2}$, $Y_{s2}$, $Z_{s2}$) 260b. Although the FIG. 2B embodiment of the present invention illustrates two candidate source locations (260a and 260b), the present invention covers any number of candidate source locations. In one embodiment of the present invention d=21.5 inches, although in other embodiments of the invention the microphone 1 250a and the microphone 2 250b may be separated by any distance d.

Figure 2C:
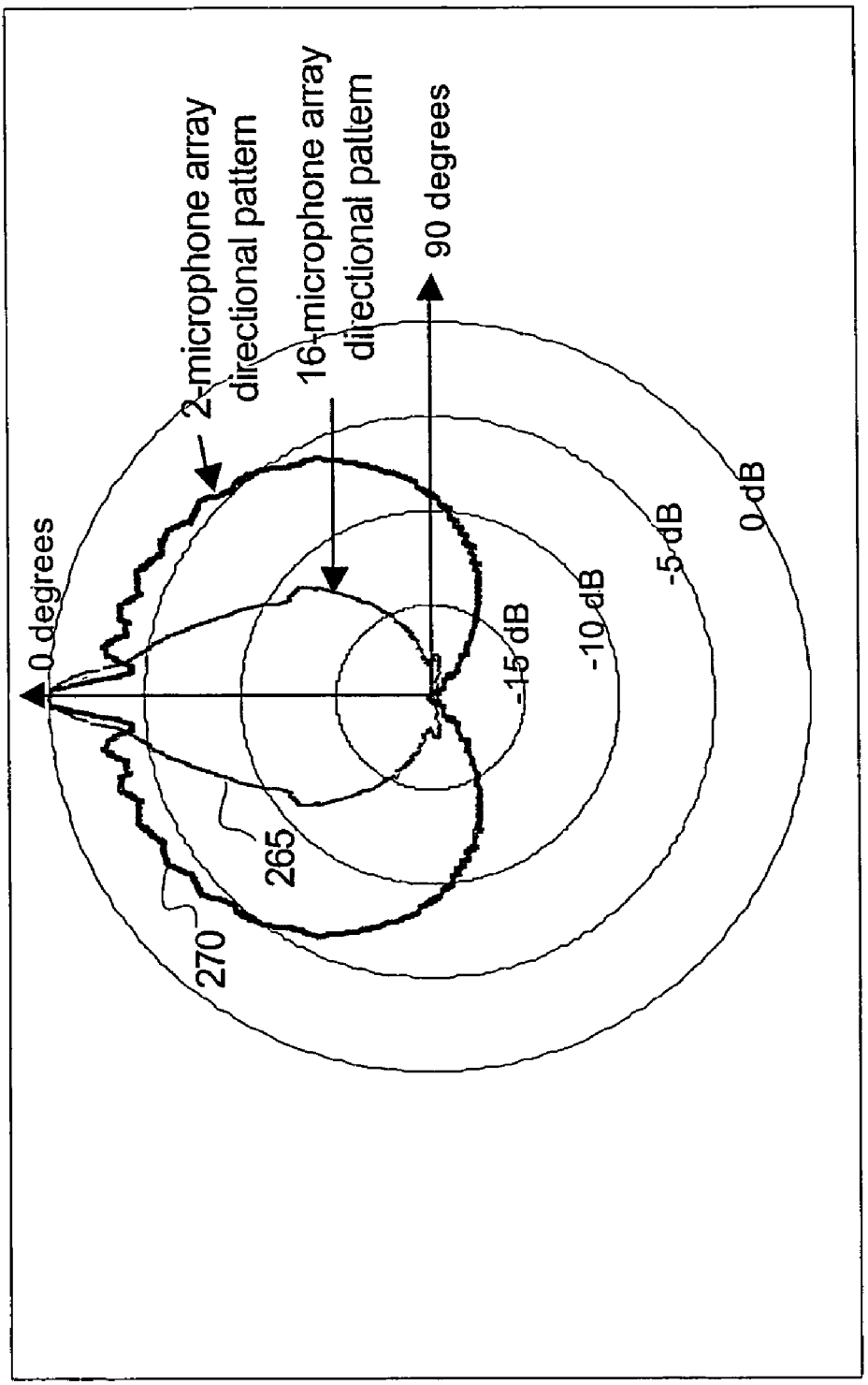
FIG. 2C is an exemplary polar plot of a total signal energy received by the 16-microphone array of FIG. 2A and a total signal energy received by the 2-microphone array of FIG. 2B.

FIG. 2C shows a 16-microphone array polar plot of total signal energy computed by acoustic source location software (i.e., application software), or firmware upon receiving acoustic signals from the acoustic source 215 (FIG. 2A) and the 16-microphone array 205 (FIG. 2A), and a 2-microphone array polar plot of total signal energy computed by the application software or firmware upon receiving acoustic signals from the acoustic source 255 (FIG. 2B) and the 2-microphone array 245 (FIG. 2B). The polar plots are also referred to as directional patterns. As illustrated in FIG. 2A and FIG. 2B, the source 215 is located at θ=0 degrees and the source 255 is located at θ=0 degrees, respectively. In generating the FIG. 2C embodiments of the 16-microphone array polar plot and the 2-microphone array polar plot, the source 215 and the source 255 are identical white noise sources spanning a frequency range of 250 Hz to 5 kHz. FIG. 2C illustrates that a magnitude of a sidelobe 265 of the 16-microphone array directional pattern is smaller than a magnitude of a sidelobe 270 of the 2-microphone array directional pattern, where sidelobe magnitude is measured in decibels (dB).

Spurious acoustic signals may be generated by reflections of acoustic source signals from walls and furnishings of a room. These spurious signals may interfere with the 2-microphone array directional pattern and the 16-microphone array directional pattern computed by the application software as illustrated in FIG. 2C. However, since the sidelobe 270 of the 2-microphone array directional pattern is greater in magnitude than the sidelobe 265 of the 16-microphone array directional pattern, the spurious signals may cause a greater uncertainty in an estimated location of the acoustic source 255 using the 2-microphone array 245. For example, the spurious signals may increase the magnitude of the sidelobe 270 of the 2-microphone array directional pattern to zero dB, thus generating an uncertainty in the estimated location of the acoustic source 255. More specifically, poor sidelobe attenuation of the 2-microphone array directional pattern may allow spurious signals to interfere with accurately estimating an acoustic source location. Thus, application software or firmware for processing acoustic signals received by the 16-microphone array 205 is the preferred embodiment of the present invention, however, the scope of the present invention covers application software or firmware for processing acoustic signals received by microphone arrays having any number of microphones distributed in any two-dimensional or three-dimensional configuration.

Since the scope of the present invention includes processing acoustic signals received by a plurality of microphones to search thousands of candidate source locations, a straightforward implementation of the maximum likelihood estimate method is computationally intense. Accordingly, the present invention uses a plurality of microphones and a computationally efficient implementation of the maximum likelihood estimate method to compute a location of an acoustic source in an accurate manner.

Figure 3A:
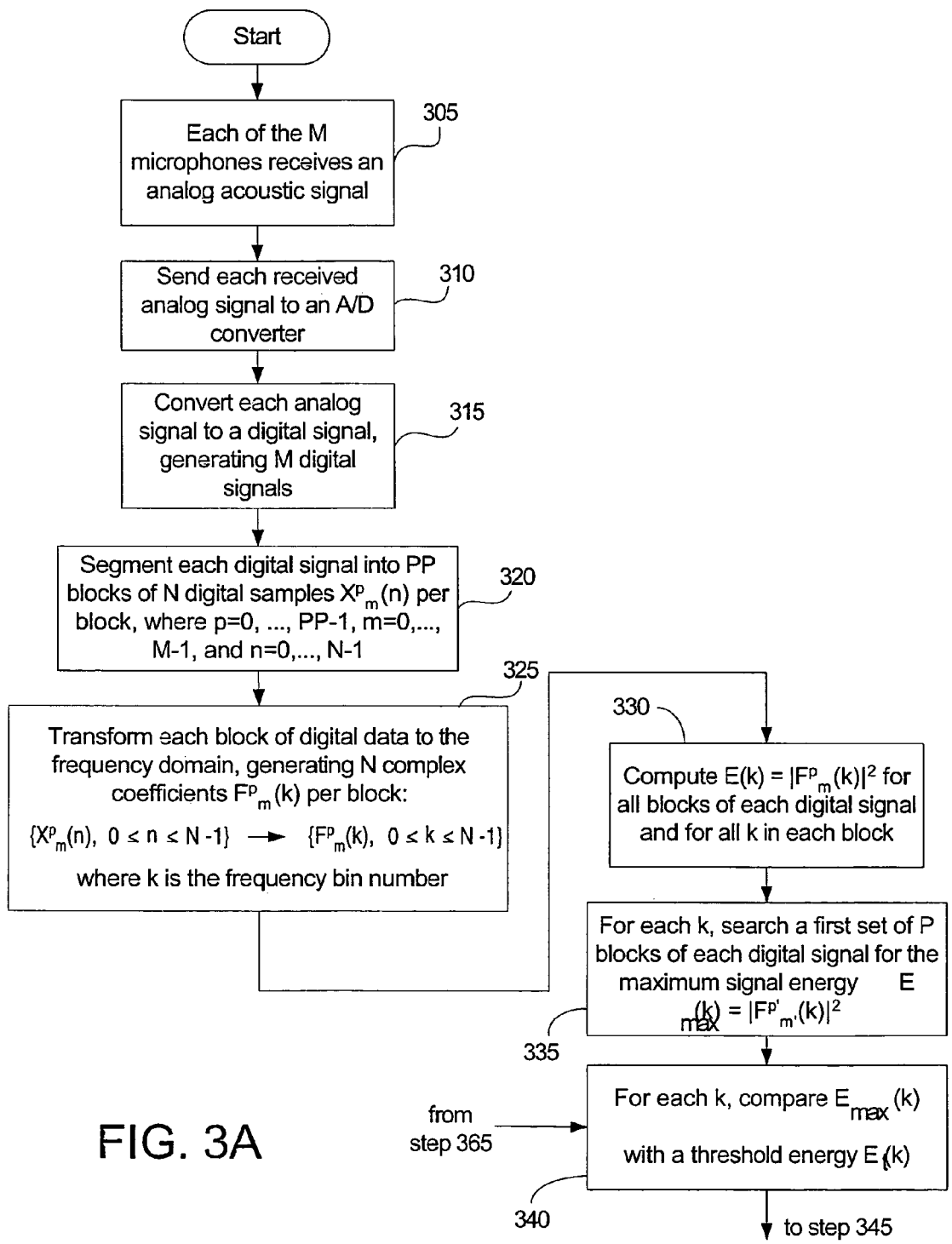
FIG. 3A is flowchart of exemplary method steps for estimating an acoustic source location, according to the present invention.

FIG. 3A is flowchart of exemplary method steps for estimating an acoustic source location, according to the present invention. In step 305, each of the M microphones (FIG. 1A, FIG. 1B, FIG. 2A, or FIG. 2B) receives an analog acoustic signal $x_m(t)$, where m is an integer microphone index which identifies each of the microphones, and $0 \leq m \leq M-1$. In step 310, each microphone sends each received analog signal to an associated A/D converter 140 (FIG. 1B). For example, in one embodiment of the invention, each analog signal received by the microphone 130 (FIG. 1B) is sent to each analog signal's associated A/D converter 140 so that in step 315 each associated A/D converter 140 converts each analog signal to a digital signal, generating M digital signals. For example, in one embodiment of the invention, each associated A/D converter 140 samples each analog signal at a sampling rate of $f_s$=32 kHz. The M digital signals are stored in the buffer 135 (FIG. 1B).

In step 320, a data segmenter 145 (FIG. 1B) segments each digital signal into PP blocks of N digital samples $X^p_m(n)$ per block, where PP is an integer, p is an integer block index which identifies a block number ($0 \leq p \leq PP-1$), n is an integer sample index which identifies a sample number ($0 \leq n \leq N-1$), and m is the integer microphone index which identifies a microphone ($0 \leq m \leq M-1$). In one embodiment of the invention, each block is of time length T=0.02 s, and each block comprises N=640 digital samples. However, the scope of the invention includes any time length T, any sampling rate $f_s$, and any number of samples per block N.

In step 325, an overlap-add filter bank 150 (FIG. 1B) performs a discrete Fast Fourier Transform (FFT) on each block of digital samples, (also referred to as digital data), to generate N complex coefficients per block, where each complex coefficient is a function of a discrete frequency identified by a frequency bin number k. More specifically, a set of N digital samples per block is mapped to a set of N complex coefficients per block: $\{X^p_m(n), 0 \leq n \leq N-1\} \rightarrow \{F^p_m(k), 0 \leq k \leq N-1\}$. The N complex coefficients $F^p_m(k)$ are complex numbers with real and imaginary components.

In step 330, the method computes a signal energy E $(k)=|F^p_m(k)|^2$ for each complex coefficient ($0 \leq p \leq PP-1$ and $0 \leq m \leq M-1$) for each frequency bin number k. More specifically, the method computes M×PP signal energies for each frequency bin number k. In this step and all subsequent steps of the FIG. 3A-3B embodiment of the present invention, methods for performing various functions and/or signal processing are described. In an exemplary embodiment of steps 330-385, the methods described are performed by the processor 160 (FIG. 1B) executing acoustic source location software, and in other embodiments, the methods described are performed by a combination of software and hardware.

In step 335, the method searches, for each frequency bin number k, the signal energies of a first set of P blocks of each digital signal for a maximum signal energy $E_{max}(k)=|F^{p'}_{m'}(k)|^2$, where p' specifies a block associated with the maximum signal energy and m' specifies a microphone associated with the maximum signal energy. In one embodiment of the invention, P=5.

Next, in step 340, the method compares each $E_{max}(k)$ with a threshold energy $E_t(k)$. In one embodiment of the invention, the threshold energy $E_t(k)$ for each frequency bin number k is a function of background noise energy for the frequency bin number k. For example, the threshold energy $E_t(k)$ may be predefined for each frequency bin number k and stored in the memory 155 (FIG. 1B), or the method may compute the threshold energy $E_t(k)$ for each frequency bin number k using the M microphone signals to compute background noise energy during periods of silence. A period of silence may occur when conference participants are not speaking to the M microphones, for example.

Figure 3B:
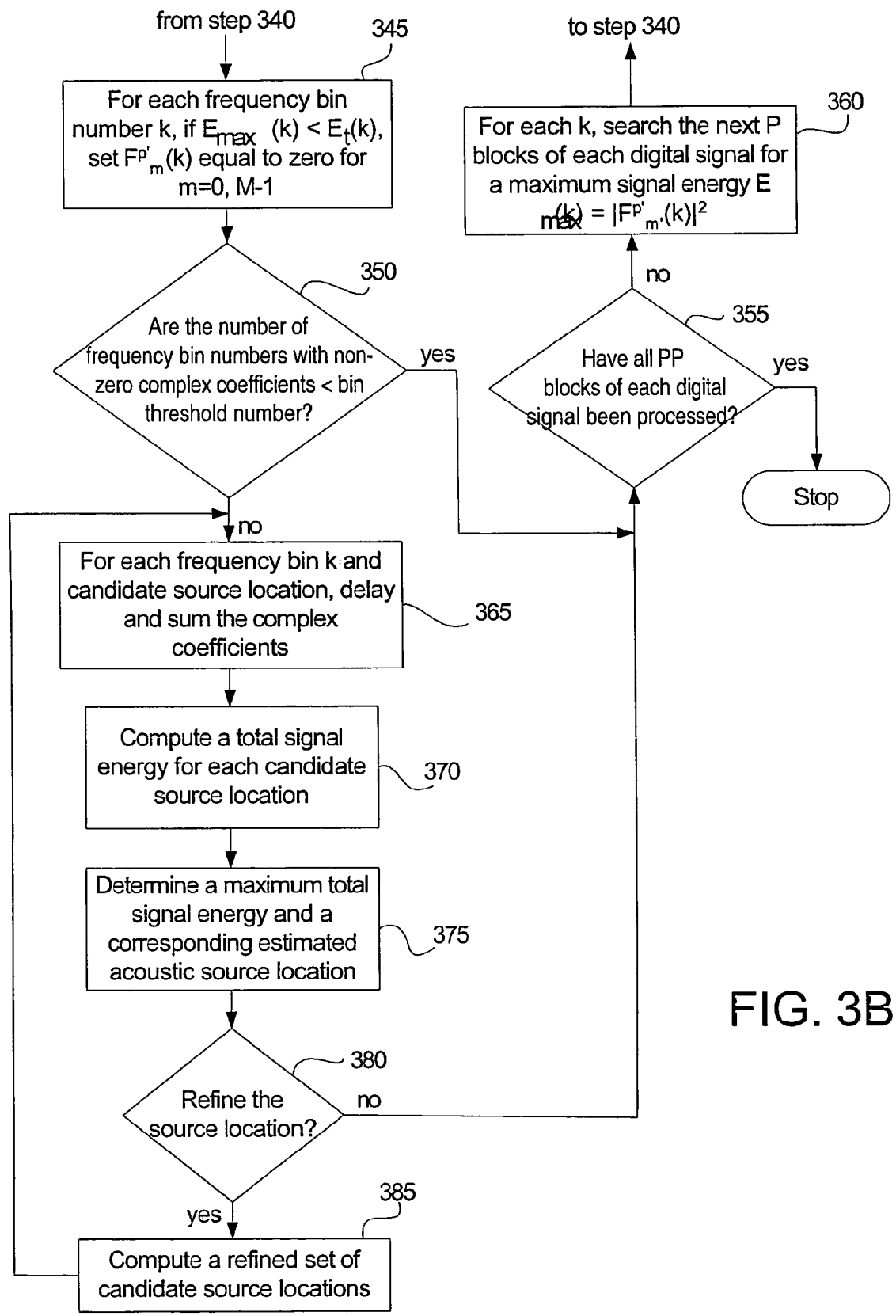
FIG. 3B is a continuation of the FIG. 3A flowchart of exemplary method steps for estimating the acoustic source location, according to the present invention.

FIG. 3B is a continuation of the FIG. 3A flowchart of exemplary method steps for estimating an acoustic source location, according to the present invention. In step 345, if $E_{max}(k) \leq E_t(k)$ for a given k, then the complex coefficients are set equal to zero for all values of m for the block p'. That is, if $E_{max}(k) \leq E_t(k)$, then $F^{p'}_m(k)=0$ for $0 \leq m \leq M-1$. The complex coefficients for a given frequency bin number k are set equal to zero when a maximum signal energy associated with those complex coefficients is below a threshold energy. If these complex coefficients are not set equal to zero, then the method may compute an inaccurate acoustic source location due to excessive noise in the acoustic signals. However, as will be seen further below in conjunction with step 365, if these complex coefficients are set equal to zero, excessive signal noise associated with frequency bin number k is eliminated in the computation of an acoustic source location.

In step 350, the method determines if the number of frequency bin numbers with non-zero complex coefficients is less than a bin threshold number. The bin threshold number may be a predefined number stored in the memory 155 (FIG. 1B). The bin threshold number is defined as a minimum number of frequency bin numbers with non-zero complex coefficients that the method requires to compute an acoustic source location. If, in step 350, the method determines that the number of frequency bin numbers with non-zero complex coefficients is less than the bin threshold number, then the total signal strength is too weak to accurately compute an acoustic source location, steps 365-385 are bypassed, and in step 355, the method determines if all PP blocks of each digital signal have been processed. If, in step 355, the method determines that all PP blocks of each digital signal have been processed, then the method ends. If, in step 355, the method determines that all PP blocks of each digital signal have not been processed, then in step 360, the method searches, for each frequency bin number k, a next set of P blocks of each digital signal for a maximum signal energy $E_{max}(k)=|F^{p'}_{m'}(k)|^2$. Then, steps 340-350 are repeated.

If, in step 350, the method determines that the number of frequency bin numbers with non-zero complex coefficients is greater than or equal to the bin threshold number, then in step 365, the complex coefficients are phase-delayed and summed over the microphone index m for each frequency bin number k and each candidate source location. Each phase delay $\theta_m$ is a function of the frequency bin number k, a candidate source location, and a microphone location (as represented by the microphone index m) with respect to a reference microphone location. For example, for a given frequency bin number k and a candidate source location (x,y,z), a summation over the index m of the phase-delayed complex coefficients $$G_{x,y,z}(k) = \sum_{m=0}^{M-1} e^{j\theta m} F^{p'}_m(k),$$

where the complex coefficients $F^{p'}_m(k)$ from block p' are phase-delayed and summed, and where p' is the block associated with the maximum signal energy for the given frequency bin number k.

A phase delay between a microphone m (i.e., a microphone corresponding to the microphone index m), and a reference microphone, such as the reference microphone 105b (FIG. 1A), is $\theta_m = 2\pi k b \Delta_m v$, where b is a width of each frequency bin number k in Hertz, v is a constant that is proportional to a reciprocal of the speed of sound (i.e., an acoustic signal speed), and $\Delta_m$ is a difference in distance between a location $(X_m, Y_m, Z_m)$ of the microphone m and a candidate source location (x,y,z), and a location $(X_r, Y_r, Z_r)$ of the reference microphone and the candidate source location (x,y,z). For example, $\Delta_m = D_m - D_r$, where $D_m = ((x-X_m)^2 + (y-Y_m)^2 + (z-Z_m)^2)^{1/2}$ is the distance between the candidate source location (x,y,z) and the location $(X_m, Y_m, Z_m)$ of the microphone m, and $D_r = ((x-X_r)^2 + (y-Y_r)^2 + (Z-Z_r)^2)^{1/2}$ is the distance between the candidate source location (x,y,z) and the location $(X_r, Y_r, Z_r)$ of the reference microphone. Space surrounding a microphone array, such as the 16-microphone array 205 (FIG. 2A), may be divided up into a plurality of coarsely or finely separated candidate source locations. For example, in one embodiment of the invention, the candidate source locations may be located along a circle with the microphone array placed at the center of the circle. In this embodiment, a radius of the circle is 10 feet, and 61 candidate source locations are place at three degree increments along the circle, spanning an angle of 180 degrees. Then, for each k and for each candidate source location, the method computes a sum over the index m of the phase-delayed complex coefficients.

In step 370, the method computes a total signal energy for each candidate source location. The total signal energy $$W(x, y, z) = \sum_k [|G_{x,y,z}(k)|^2 / |S(k)|^2],$$

where a total energy $|G_{x,y,z}(k)|^2$ received by the M microphones in the frequency bin number k from the candidate source location (x,y,z) is normalized by a whitening term $|S(k)|^2$. The whitening term is an approximate measure of the signal strength in frequency bin number k. In one embodiment of the present invention, the method computes $|S(k)|^2$ by averaging the signal energy of all the microphone signals for a given k, where $$|S(k)|^2 = \sum_m |F_m^{p'}(k)|^2.$$

Normalization of the total energy $|G_{x,y,z}(k)|^2$ of frequency bin number k by the whitening term $|S(k)|^2$ allows all frequency components of an acoustic source to contribute to the computation of a location of the acoustic source.

Typically, the total signal energy W(x,y,z) is computed by a summation over k, where k=0, ..., N−1. However, the scope of the present invention also includes a trimmed frequency summation, where k is summed from a low frequency bin number ($k_{low}$<0) to a high frequency bin number ($k_{high}$<N−1). By ignoring the very low and the very high frequency components in the summation of the total signal energy, cost to compute a location of the acoustic source is reduced.

In step 375, the method determines a maximum total signal energy, and thus a candidate source location associated with the maximum total signal energy. The candidate source location associated with the maximum total signal energy is identified as an estimated location of the acoustic source.

In step 380, if the location of the acoustic source is to be refined, then in step 385, the method computes a refined set of candidate source locations. For example, in one embodiment of the invention, the computed refined set of candidate source locations are centered about the acoustic source location computed in step 375. In another embodiment of the invention, the method uses a refined set of candidate source locations stored in the memory 155. For example, the stored refined set of candidate source locations may be located along six concentric rings in a quarter of a degree increments along each ring, where each concentric ring has a unique radius and each concentric ring spans 180 degrees. In this embodiment of the invention, there are 4326 refined candidate source locations. As discussed further below in conjunction with a more detailed description of step 365, the stored refined candidate source locations may be incorporated in look-up tables stored in the memory 155.

Next, steps 365-380 are repeated, and a refined acoustic source location is computed. However, if in step 380, a refinement to the acoustic source location is not desired, then in step 355, the method determines if all PP blocks of each digital signal have been processed. If all PP blocks of each digital signal have been processed, then the method ends. If, in step 355, all PP blocks of each digital signal have not been processed, then in step 360 the method searches, for each frequency bin number k, the next set of P blocks of each digital signal for a maximum signal energy $E_{max}(k)=|F^{p'}_m(k)|^2$, and the method continues at step 340.

Referring back to step 365, the method phase-delays each complex coefficient by multiplying each complex coefficient with a transcendental function $e^{i\theta}_m=\cos(\theta_m)+i\cdot\sin(\theta_m)$. It is costly and inefficient to compute the transcendental function at run-time. It is more efficient to pre-compute values of the transcendental function ($\cos(\theta_m)$ and $\sin(\theta_m)$) before run-time, and store the values in look-up tables (not shown) in the memory 155 (FIG. 1B). However, since in one embodiment of the invention a number of candidate source locations is 4326, a number of frequency bin numbers is 640, and a number of microphone signals is M=16, and since $\theta_m$ is a function of a candidate source location, a location of a microphone m, and a frequency bin number k, the look-up tables for $\cos(\theta_m)$ and $\sin(\theta_m)$ include 2·4326·640·16=88,596,480 entries. Using a processor with 16 bit precision per entry and eight bits per byte requires approximately 177 M bytes of memory to store the look-up tables.

To reduce memory requirements of the look-up tables and decrease cost of system hardware, alternate (phase delay) look-up tables are generated according to the present invention. In one embodiment of the invention, the method generates a look-up table $D(r,m)=(512\cdot\theta_m)/(2\pi k)=512\cdot b\cdot\Delta_m\cdot v$, where r is a vector from a microphone array to a candidate source location (see FIG. 2A), and m is the microphone index. If there are 4326 candidate source locations and 16 microphones, then the look-up table D(r,m) has 4326·16=69,216 entries. In addition, the method generates a modulo cosine table $\cos\_table(i)=\cos(\pi\cdot i/256)$ with 512 entries, where i= 0, ..., 511. Finally, $\cos(\theta_m)$ may be obtained for a given candidate source location and a given frequency bin number k by a formula $\cos(\theta_m)=\cos\_table(0x1FF \& int(k\cdot D(r,m)))$. The argument int(k·D(r,m)) is a product k·D(r,m) rounded to the nearest integer, the argument 0x1FF is a hexadecimal representation of the decimal number 511, and & is a binary "and" function. For example, a binary representation of 0x1FF is the 9-bit representation 1 1 1 1 1 1 1 1 1. If, for example, $\theta_m=\pi/2$, then int(k·D(r,m))=int((512·$\theta_m$)/2π)= 128=0 1 0 0 0 0 0 0 0 in binary. Therefore, $\cos(\theta_m)=\cos\_table$ ((1 1 1 1 1 1 1 1 1) & (0 1 0 0 0 0 0 0 0))=cos_table(128)=cos (π·128/256)=cos(π/2).

According to one embodiment of the present invention which comprises 4326 candidate source locations and 16 microphones, the method of generating $\cos(\theta_m)$ and $\sin(\theta_m)$ of the transcendental function $e^{i\theta}_m$ requires only three look-up tables: the look-up table D(r,m) with 69,216 entries, the modulo cosine table cos_table(i) with 512 entries, and a modulo sine table sin_table(i) with 512 entries, where the modulo sine table $\sin\_table(i)=\sin(\pi\cdot i/256)$. Thus, a total number of 70,240 entries are associated with the three look-up tables, requiring approximately 140 k bytes of memory. The 140 k bytes of memory required for the three tables is more than 1000 times less than the 177 M bytes of memory required to store every value of the transcendental function.

The invention has been explained above with reference to preferred embodiments. Other embodiments will be apparent to those skilled in the art in light of this disclosure. The present invention may readily be implemented using configurations other than those described in the preferred embodiments above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for computing a location of an acoustic source, comprising:
    an array of microphones for receiving acoustic signals generated by the acoustic source;
    a memory configured to store phase-delay look-up tables based upon a plurality of candidate source locations and a spatial configuration of the array of microphones; and
    a processor for computing the location of the acoustic source by processing the received acoustic signals using the phase-delay look-up tables.

2. The system of claim 1, further comprising at least one A/D converter for digitizing the received acoustic signals.

3. The system of claim 1, further comprising a data segmenter for segmenting digitized received acoustic signals into a plurality of blocks.

4. The system of claim 1, further comprising an overlap-add filter bank for performing a discrete Fast Fourier Transform (FFT).

5. A system for computing a location of an acoustic source, the system comprising:
- a microphone array including a plurality of microphones configured to receive acoustic signals generated by the acoustic source;
- at least one analog to digital converter configured to generate a plurality of digital signals corresponding to the acoustic signals received by the plurality of microphones;
- at least one data segmenter configured to divide each digital signal into a plurality of blocks;
- at least one filter bank configured to perform a transformation on each of the plurality of blocks from the time domain to the frequency domain, thereby creating a plurality of transformed blocks, each transformed block comprising a plurality of complex coefficients and each complex coefficient being associated with a frequency bin; and
- a processor configured to compute the location of the acoustic source from the transformed blocks by computing a total signal energy received from each of a plurality of candidate source locations and selecting as the location of the acoustic source one of the plurality of candidate source locations having a highest total signal energy.

6. The system of claim 5 wherein the plurality of candidate source locations are located along a circle having as its center the microphone array.

7. The system of claim 5 wherein computing a total signal energy received from each of a plurality of candidate source locations comprises:
- multiplying the complex coefficients of each transformed block by a predetermined phase delay corresponding to a candidate source location, wherein the predetermined phase delay is stored in a look-up table stored in a memory operatively coupled to the processor; and
- summing the complex coefficients to compute a signal energy for each frequency bin;
- normalizing the signal energy for each frequency bin; and
- summing the normalized signal energies for each candidate source location.

8. The system of claim 7 wherein summing the normalized signal energies for each candidate source location comprises omitting from the sum very low and very high frequency bins.

9. The system of claim 7 wherein computing a total signal energy received from each of a plurality of candidate source locations further comprises, for each of the transformed blocks, setting the coefficients to zero in each block where the maximum energy is less than a threshold energy.

10. The system of claim 9 wherein the threshold energy is predefined and stored in a memory.

11. The system of claim 10 wherein the threshold energy is computed using the plurality of microphone signals during periods of silence.

12. The system of claim 5 wherein the plurality of microphones is two microphones.

13. The system of claim 5 wherein the plurality of microphones is three microphones.

14. The system of claim 5 wherein the plurality of microphones is more than three microphones.

15. The system of claim 5 wherein the plurality of microphones is sixteen microphones.

16. The system of claim 5 wherein the microphone array is a two-dimensional array.

17. The system of claim 5 wherein the microphone array is a three-dimensional array.

18. The system of claim 5 wherein the processor is configured to refine the computed location of the acoustic source by computing a total signal energy received from each of a plurality of refined candidate source locations and selecting as the refined location of the acoustic source one of the plurality of refined candidate source locations having a highest total signal energy.

19. The system of claim 18 wherein the plurality of microphones is two microphones.

20. The system of claim 18 wherein the plurality of microphones is three microphones.

21. The system of claim 18 wherein the plurality of microphones is more than three microphones.

22. The system of claim 18 wherein the plurality of microphones is sixteen microphones.

23. The system of claim 18 wherein the microphone array is a two-dimensional array.

24. The system of claim 18 wherein the microphone array is a three-dimensional array.

25. The system of claim 18 wherein the refined candidate source locations are centered about the first selected candidate source location.

26. The system of claim 18 wherein computing a total signal energy received from each of a plurality of candidate source locations comprises:
- multiplying the complex coefficients of each transformed block by a predetermined phase delay corresponding to a candidate source location, wherein the predetermined phase delay is stored in a look-up table stored in a memory operatively coupled to the processor; and
- summing the complex coefficients to compute a signal energy for each frequency bin;
- normalizing the signal energy for each frequency bin; and
- summing the normalized signal energies for each candidate source location.

27. The system of claim 26 wherein summing the normalized signal energies for each candidate source location comprises omitting from the sum very low and very high frequency bins.

28. The system of claim 18 wherein the refined candidate source locations are predetermined candidate source locations stored in a memory.

29. The system of claim 28 wherein the refined candidate source locations are located along a plurality of concentric rings.

30. The system of claim 29 wherein computing a total signal energy received from each of a plurality of candidate source locations further comprises, for each of the transformed blocks, setting the coefficients to zero in each block where the maximum energy is less than a threshold energy.

31. The system of claim 30 wherein the threshold energy is predefined and stored in a memory.

32. The system of claim 31 wherein the threshold energy is computed using the plurality of microphone signals during periods of silence.

33. A method for computing the location of an acoustic source, the method comprising:
- receiving a plurality of analog signals from a microphone array comprising a plurality of microphones;
- digitizing each of the received plurality of analog signals;
- segmenting each digitized signal into a plurality of blocks;

transforming each of the plurality of blocks from the time domain to the frequency domain;

computing from the transformed blocks a total signal energy received from each of a plurality of candidate source locations; and selecting as the location of the acoustic source the candidate source location highest total signal energy.

34. The method of claim 33 wherein the plurality of candidate source locations are located along a circle having as its center the microphone array.

35. The method of claim 33 wherein computing from the transformed blocks a total signal energy received from each of a plurality of candidate source locations comprises:

multiplying complex coefficients of each transformed block by a predetermined phase delay corresponding to a candidate source location; and summing the multiplied coefficients to compute a signal energy.

36. The method of claim 33 wherein computing a total signal energy received from each of a plurality of candidate source locations comprises:

multiplying the complex coefficients of each transformed block by a predetermined phase delay corresponding to a candidate source location; and summing the multiplied coefficients to compute a signal energy for each of a plurality of frequency bins;

normalizing the signal energy for each frequency bin; and summing the normalized signal energies for each candidate source location.

37. The method of claim 36 wherein summing the normalized signal energies for each candidate source location comprises omitting from the sum very low and very high frequency bins.

38. The method of claim 36 further comprising, for each of the transformed blocks, setting the coefficients to zero in each block where the maximum energy is less than a threshold energy.

39. The method of claim 38 wherein the threshold energy is predefined and stored in a memory.

40. The method of claim 39 wherein the threshold energy is computed using the plurality of microphone signals during periods of silence.

41. The method of claim 33 further comprising:

refining the selected location of the acoustic source by computing from the transformed blocks a total signal energy received from each of a plurality of refined candidate source locations; and selecting as the refined location of the acoustic source one of the plurality of refined candidate source locations having a highest total signal energy.

42. The method of claim 41 wherein the refined candidate source locations are centered about the first selected candidate source location.

43. The method of claim 41 wherein computing from the transformed blocks a total signal energy received from each of a plurality of candidate source locations comprises:

multiplying complex coefficients of each transformed block by a predetermined phase delay corresponding to a candidate source location; and summing the multiplied coefficients to compute a signal energy.

44. The method of claim 41 wherein the refined candidate source locations are predetermined candidate source locations stored in a memory.

45. The method of claim 44 wherein the refined candidate source locations are located along a plurality of concentric rings.

46. The method of claim 41 wherein computing a total signal energy received from each of a plurality of candidate source locations comprises:

multiplying the complex coefficients of each transformed block by a predetermined phase delay corresponding to a candidate source location; and summing the multiplied coefficients to compute a signal energy for each of a plurality of frequency bins;

normalizing the signal energy for each frequency bin; and summing the normalized signal energies for each candidate source location.

47. The method of claim 46 wherein summing the normalized signal energies for each candidate source location comprises omitting from the sum very low and very high frequency bins.

48. The method of claim 46 further comprising, for each of the transformed blocks, setting the coefficients to zero in each block where the maximum energy is less than a threshold energy.

49. The method of claim 48 wherein the threshold energy is predefined and stored in a memory.

50. The method of claim 49 wherein the threshold energy is computed using the plurality of microphone signals during periods of silence.

* * * * *